UNITED STATES PATENT OFFICE.

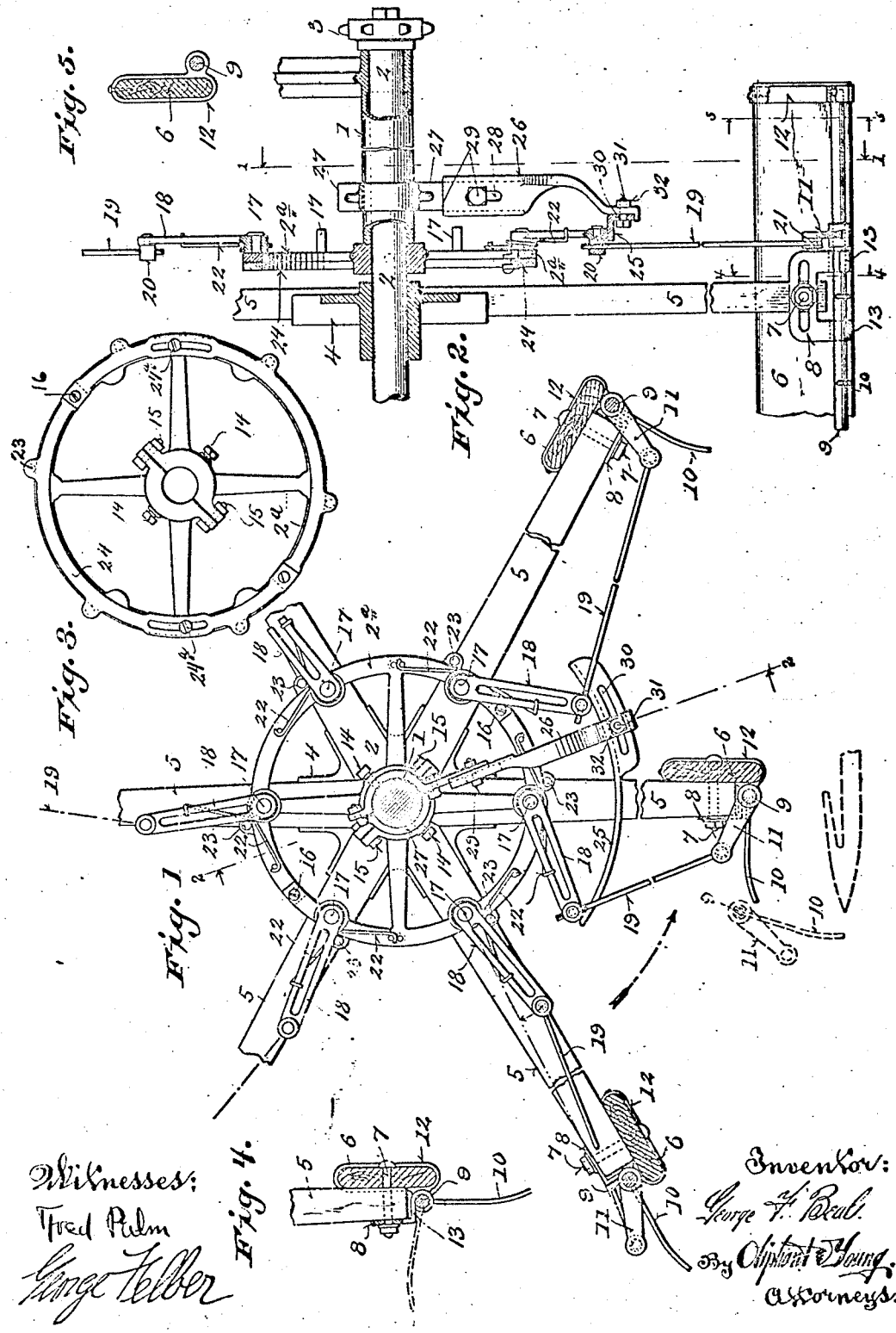

GEORGE FRANKLIN BEAL, OF LAKE, WISCONSIN, ASSIGNOR, BY DIRECT AND MESNE ASSIGNMENTS, TO CHARLES F. SIEGEL, OF LAKE, WISCONSIN.

HARVESTER-REEL.

No. 895,147.      Specification of Letters Patent.      Patented Aug. 4, 1908.

Application filed August 19, 1907. Serial No. 389,127.

*To all whom it may concern:*

Be it known that I, GEORGE FRANKLIN BEAL, a citizen of the United States, and resident of the town of Lake, in the county of Milwaukee and State of Wisconsin, have invented certain new and useful Improvements in Harvester-Reels; and I do hereby declare that the following is a full, clear, and exact description thereof.

The primary object of my invention is to provide a rake-attachment for harvester-reels for picking up, straightening and delivering fallen grain to the knives of a harvester, its construction and arrangement being such that the entire apparatus may be readily and quickly applied to the various designs of harvesters without previous cutting or fitting of any of the reel parts to accommodate said attachment.

Said invention therefore consists in various details of construction and combination of mechanical elements as hereinafter described with reference to the accompanying illustrations and subsequently claimed.

In the drawings: Figure 1 represents a sectional elevation of a fragment of a harvester-reel provided with a rake-attachment embodying the features of my invention, the section being indicated by line 1—1 of Fig. 2; Fig. 2, a longitudinal sectional view of the same, as indicated by line 2—2 of Fig. 1; Fig. 3, a detail face-view of a spider-support for the rake feathering arm; Fig. 4, a detail sectional view of a rake-rod bearing-bracket showing the manner of securing said bearing-bracket directly to the reel-arms, by means of which construction the bolts for securing the bats to said reel-arms are utilized, and Fig. 5, is a cross-section of a reel-bat showing an end-ferrule thereon in which is socketed the rake-rod, the rod thereby serving to stiffen the bat, while the ferrule prevents splitting of the same and also serves as a guard against grain being caught between the rod and bat.

Referring by numerals to the drawings, 1 indicates the sleeve of a reel-support, which sleeve forms a bearing for a reel-shaft 2, the said shaft being driven by a sprocket-wheel 3 from a suitable driving-gear of the harvester, (not shown). Fast on the reel-shaft adjacent the end of sleeve 1, is a reel-hub 4, having radial socketed spokes for reel-arms 5, to the outer ends of which arms are secured the usual bats 6, by bolts 7, these bolts also serving as keepers for bearing-brackets 8 that support rake-rods 9. The rake-rods are provided with series of rake-teeth 10, and are arranged to be oscillated in their bearings by rock-arms 11 fast adjacent to the inner ends of said rake-rods. The rake-rods, as shown, are arranged parallel with the bats and near their outer edges, being to the rear or opposite side of said bats, from that which strikes the grain, their location thus preventing snarling of the parts as the aforesaid bats enter and leave the grain.

It should be understood that the outer end of the reel (not shown) is similarly equipped with bearing-brackets 8 and reel-arms connected to a reel-hub mounted on the reel-shaft 2, which shaft is shown broken away. Both ends of the bats are also provided with ferrules 12, each of which comprises a flat loop fitted over the bat-end and secured thereto by a brad or screw, there being a hollow boss projecting from the loop-portion, which serves as a socket for the ends of the rake-rods. The body-portion of each bearing-bracket 8 is slotted for the reception of its bat-bolt 7, the slot being provided to permit lateral adjustment, in order that bracket-legs 13 which depend from the body-portion may clear adjacent rake-teeth. These legs terminate in open loops forming bearings for the rake-rods, which rods are inserted therein and pushed through until their ends are in position to be capped by the ferrules 12, the open loops of the bracket legs permitting the teeth to pass freely therethrough, when said teeth are elevated to the position as indicated by dotted lines in Fig. 4.

From the foregoing description it will be seen that the rakes are attached by simply removing the bat bolt-nuts and replacing them after the brackets are in position on the reel-arms, thus taking all strain from the bats as would occur should the rake-rods be mounted directly on the same.

The above described method of securing the rake-rods directly to the arms is an important feature of my invention, owing to its simplicity, in view of the fact that the bats of standard reels are all secured to the arms by a single bolt as shown in the drawings, which bolt in this instance is utilized also as a retaining-bolt for the brackets with the before mentioned results. The end-ferrules are then secured to the bats with their bosses engaging the rake-rods, which bosses serve to prevent end-thrust of the rods and also bridge the space between said bats and rods, to guard against grain being snarled there between. The construction also serving to add rigidity to the aforesaid bats by their connection with the ends of the rods.

A split spider 2ª is secured to the reel-shaft, between the reel-hub and sleeve 1, by means of set-screws 14, the sections being fastened together by hub-bolts 15 and screws 16 in threaded-connection with overlapping ears of an outer ring-portion. Mounted on studs 17 of the ring-portion of the spider are a series of feathering-arms 18, which arms are connected to the rock-arms 11 of the rake-rods by rod 19. These rods are threaded into swivel-block 20 carried at the free ends of the feathering arms, said rods being secured to the rock-arms by means of loop-eyes fitted over studs 21 projecting therefrom, by means of which construction the length of the rods between the feathering and rock-arms may be regulated, the said rods being first run into the threaded blocks and thereafter fitted over the studs 21, on which they are retained by a suitable washer and screw as shown. The feathering-arms 18 are held in a normal radial position by means of springs 22, each of which springs is coiled around the hub of the arms having one end hooked over said arms and the opposite end engaging a pin projecting from the spider. When the feathering-arms are in their above described normal position the rake-teeth project beyond the bats and are ready for work. In this position it will be observed that the free ends of the arms 18 have, by their springs, been thrown slightly forward of an imaginary line intersecting the studs 21 of the rock-arms and their pivot-studs 17, the said arms being checked against further motion by stop-pins 23. Owing to this broken-joint relation between the parts, any tendency of the rake-teeth to recede, caused through strain, will now be taken up by the stop-pins, thus removing all strain from the springs to hold the teeth in their working position, by reason of which the springs may be quite delicate, the only necessary tension being that required to throw the rake-teeth out. The stop-pins 23 are carried by a supplementary ring 24, which as shown in Fig. 3 of the drawings, is secured to the ring-portion of the spider 2ª by means of screws 24ª engaging slots in said ring 24 and in threaded-connection with the spider. The slots permit radial adjustment of the ring upon the ring-portion of the spider, by which adjustment the stop-pins on said ring 24 will regulate the outward throw of the feathering-arms, and when a harvester is not working in falling or tangled grain, this ring may be turned so that its stop-pins will force the feathering-arms down or at a tangent to the ring in such a position that the rake-teeth will be drawn up and out of their working-position, the ring being thereafter locked by the screws.

Rakes of the class to which my invention relates must be drawn up or feathered when they reach the point of the guards or thereabout, and held in this position for a predetermined time so that the rake-teeth will draw out of the grain, the various positions being clearly shown in Fig. 1 of the drawings.

The above mentioned feathering operation is accomplished by means of a stationary sector 25, which is placed in the path of the feathering-arms and concentric with their supporting-spider. This sector serves as a track which said feathering-arms engage as they are revolved with the reel, causing the aforesaid arms to move inward and through their connection draw the rake-teeth upward so that they clear the cutting-apparatus or guards of the harvester, as the reel travels in the direction indicated by the arrow in Fig. 1. The ends of the feathering-arms travel on the sector and hold the teeth in their retracted position until such time as said arms run off the same, when the parts assume their normal position. The sector is supported by a spoke 26, which spoke is clipped to the sleeve 1 of the harvester reel-support, by a U-shaped bolt 27, the said spoke being in two sections for lengthwise adjustment, whereby the sector may be raised or lowered with relation to the pivot studs of the feathering-arms, by means of which adjustment the throw of the rake-teeth may be regulated. The said adjustment is obtained by means of slot 28 in the lower section of the spoke, which slot is engaged by a bolt 29 that passes through the upper spoke-section serving to clamp the two parts together. The sector is also adjustable circumferentially, with relation to the spider, by means of a slot 30 therein, through which slot a clamping-bolt 31 passes and is secured to the spoke-end by a nut 32, the said adjustment being provided for the purpose of advancing or delaying the time of feathering the rakes with relation to the point of the guards, which guards are indicated by dotted lines in Fig. 1 of the drawings.

By splitting the spider and ring as described, these parts may readily be adjusted to the reel drive-shaft, the U-shaped bolt of the sector-spoke being provided for attaching the same in a like manner to the drive-shaft bearing and also for the purpose of adjustment.

I claim:

1. In a harvester-reel, a drive-shaft, a series of reel-arms secured thereto, bats secured to the reel-arms, and a bearing for the drive-shaft; in combination with an attachment comprising toothed rake-rods carried by the reel, rock-arms secured to the rake-rods, a rotatory spider in connection with said reel, pivoted feathering-arms carried by the spider, actuating-springs in connection with the feathering-arms and spider, whereby the ends of the rake-teeth are forced outward into their working-position, stop-pins for said feathering-arms in opposition to the actuating-springs, whereby the aforesaid feathering-arms are held in locked position, a sector in the path of the feathering-arms, and supporting means for the sector in connection with the reel driving-shaft bearing.

2. In a harvester-reel, a drive-shaft, a series of reel-arms secured thereto, bats secured to the arms, and a bearing for the drive-shaft; in combination with an attachment comprising toothed rake-rods carried by the reel, rock-arms secured to the rake-rods, a spider secured to the drive-shaft, spring-controlled feathering-arms pivoted on the spider, an adjustable ring carried by said spider, stop-pins for the feathering-arms projecting from the ring, rods connecting said feathering-arms and rock-arms of the rake-rods, and an actuating sector for the aforesaid feathering-arms in connection with the reel driving-shaft bearing.

3. In a harvester-reel, a drive-shaft, a series of reel-arms secured thereto, bats secured to the reel-arms, and a bearing for the drive-shaft; in combination with an attachment comprising brackets secured to said reel-arms, toothed rake-rods mounted in the brackets, ferrules fitted to the ends of the reel-bats, hollow bosses on the ferrules, adapted to receive the ends of the rake-rods, rock-arms secured to said rake-rods, a feathering-mechanism revoluble with the reel, and means in connection with the reel driving-shaft for actuating the feathering-mechanism.

4. In a harvester-reel, a drive-shaft, a series of reel-arms secured thereto, bats secured to the arms, and a bearing for the drive-shaft; in combination with an attachment comprising toothed rake-rods carried by the reel, rock-arms secured to the rake-rods, a spider secured to the reel drive-shaft, pivot studs projecting from the spider, feathering-arms pivoted on the studs, coil-springs surrounding the pivot studs of the arms, the ends of the springs being connected to said arms and spider respectively, stop-pins for the aforesaid arms carried by said spider, a sector track in adjustable connection with the drive-shaft bearing for actuating the feathering-arms in opposition to the springs, and rods connecting the said feathering-arms and rock-arms of the rake-rods.

5. In a harvester-reel, a drive-shaft, a series of reel-arms secured thereto, bats for the arms, and bolts for securing the bats and arms together; in combination with a rake-attachment comprising rake-rods, bearing-brackets for the rake-rods carried by the reel-arms and secured thereto by the bat-securing bolts, and means in connection with the reel drive-shaft for feathering said rake-rods.

6. A harvester-reel comprising a drive-shaft, a series of reel-arms and bats, brackets mounted upon the reel-arms, bolts securing the bats, brackets, and reel-arms together, toothed rake-rods loosely mounted in the brackets, and means for automatically feathering the toothed rake-rods.

7. A harvester-reel comprising a drive-shaft, a series of reel-arms, and bats secured to the reel-arms, toothed rake-rods pivotally mounted immediately on said reel-arms independent of the bats, and means for automatically feathering the toothed rake-rods.

8. A harvester-reel comprising a drive-shaft, a series of reel-arms, bats fitted to one face of the arms, bearing brackets fitted to the opposite face of the arms, securing-bolts passing through the bats, reel-arms and brackets, toothed rake-rods mounted in the bearing-brackets, and means for automatically feathering the toothed rake-rods.

9. A harvester-reel comprising a drive-shaft, a series of reel-arms, and bats secured to the reel-arms, toothed rake-rods pivotally mounted immediately on said reel-arms, ferrules fitted to the ends of the bats, hollow bosses on the ferrules adapted to receive the ends of the toothed rake-rods, and means for automatically feathering the toothed rake-rods.

In testimony that I claim the foregoing I have hereunto set my hand at Milwaukee in the county of Milwaukee and State of Wisconsin in the presence of two witnesses.

GEORGE FRANKLIN BEAL.

Witnesses:
 GEO. W. YOUNG,
 GEORGE FELBER.